United States Patent [19]
Ohki

[11] 3,940,949
[45] Mar. 2, 1976

[54] HYDRAULIC, AUTOMATICALLY ADJUSTABLE TIMING DEVICE FOR FUEL INJECTION

[75] Inventor: Seibi Ohki, Higashi-Matsuyama, Japan

[73] Assignee: Diesel Kiki Kabushiki Kaisha, Tokyo, Japan

[22] Filed: Sept. 30, 1974

[21] Appl. No.: 510,737

[30] Foreign Application Priority Data
Oct. 5, 1973 Japan.............................. 48-111502

[52] U.S. Cl. .......... 64/25; 137/625.24; 137/625.21; 251/311
[51] Int. Cl.² ........................................ F16D 5/00
[58] Field of Search.................. 137/625.21, 625.24; 251/311; 64/25

[56] References Cited
UNITED STATES PATENTS

| | | | |
|---|---|---|---|
| 751,281 | 2/1904 | Gillette .......................... | 137/625.24 |
| 2,946,348 | 7/1960 | North............................. | 137/625.21 |
| 3,296,940 | 1/1967 | Eddy et al...................... | 137/625.24 |
| 3,411,986 | 11/1968 | Buchberger et al. ............ | 251/311 |
| 3,709,001 | 1/1973 | Suzuki ........................... | 64/25 |

*Primary Examiner*—Samuel Scott
*Assistant Examiner*—Randall Heald
*Attorney, Agent, or Firm*—Henry R. Lerner

[57] ABSTRACT

A hydraulic, automatically adjustable timing device for fuel injection wherein vanes of rotor and radial members of casing form operating chambers, each having a passage to permit fluid in and out; a pilot valve is disposed in the drive shaft, is rotatable by centrifugal force of flyweights and controls the opening and closing of fluid chambers, resulting in rotational transmission and relative movement between the shafts through fluid present in the chambers; and a flat shaft of the pilot valve forms lands to control communication of the flow passage with the fluid chambers.

2 Claims, 8 Drawing Figures

FIG. 6
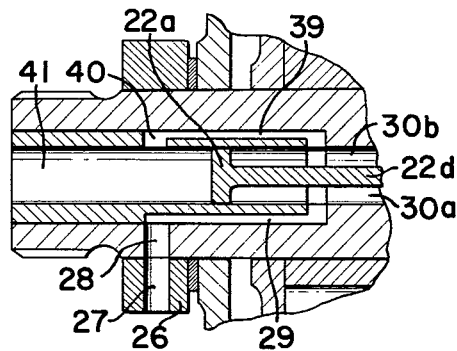
FIG. 7
FIG. 8
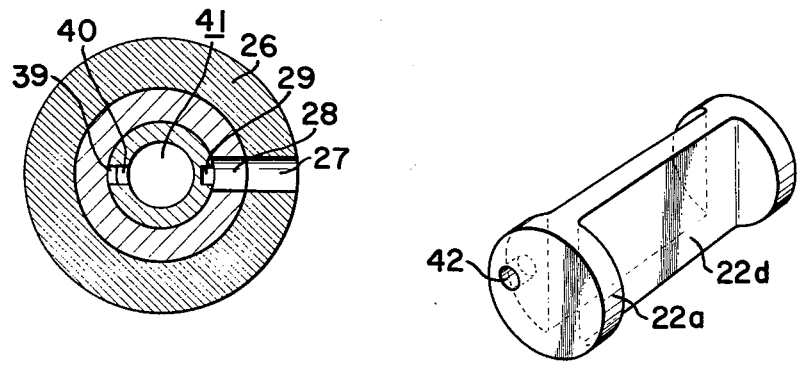

HYDRAULIC, AUTOMATICALLY ADJUSTABLE TIMING DEVICE FOR FUEL INJECTION

This invention relates to a hydraulic, automatically adjustable timing device for fuel injection and more particularly to improvements in the device of U.S. Pat. No. 3,709,001 (corresponding to Japanese Pat. No. 631,593).

The device of the above Patent is excellent in performance by its construction, particularly its pilot valve.

An object of this invention is to obtain a device of this kind which is reliable to operate and easy to manufacture by producing advantageously and more easily its construction, particularly a pilot valve controlling mechanism.

Figure 1:
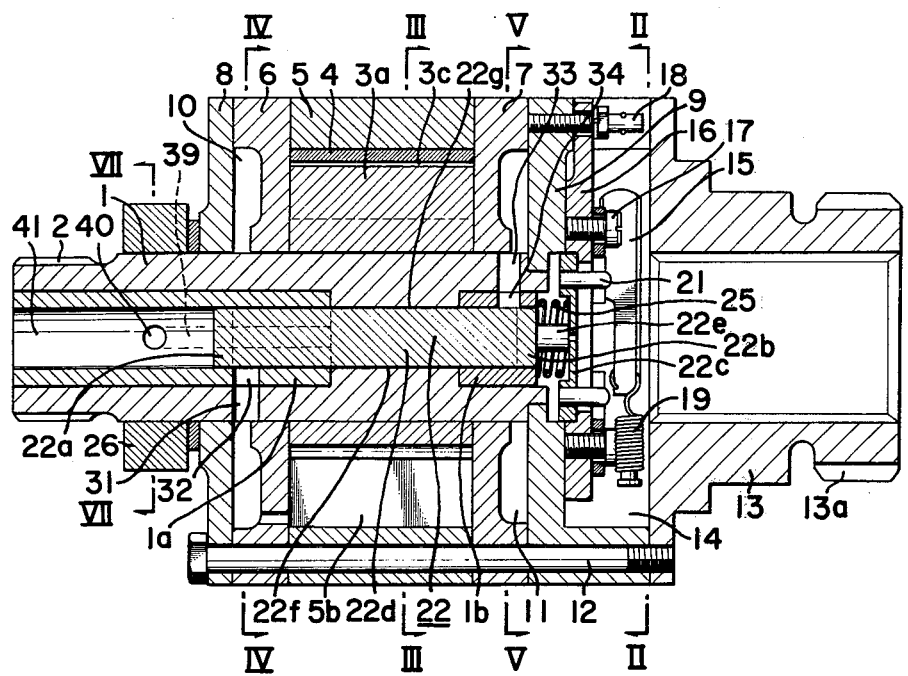

In order that this invention may be more readily understood, reference will now be made, by way of example, to the accompanying drawings in which:

FIG. 1 shows an embodiment of this invention and is a vertical sectional view taken along the line I—I of FIG. 3, FIGS. 2 to 5 are cross sectional views taken along the lines II—II, III—III, IV—IV and V—V of FIG. 1 respectively, FIG. 6 is a horizontal cross sectional view of a part of FIG. 1, FIG. 7 is a vertical sectional view taken along the line VII—VII of FIG. 1 and showing an essential part only and FIG. 8 is a perspective view of the other embodiment of a pilot valve.

Figure 2:
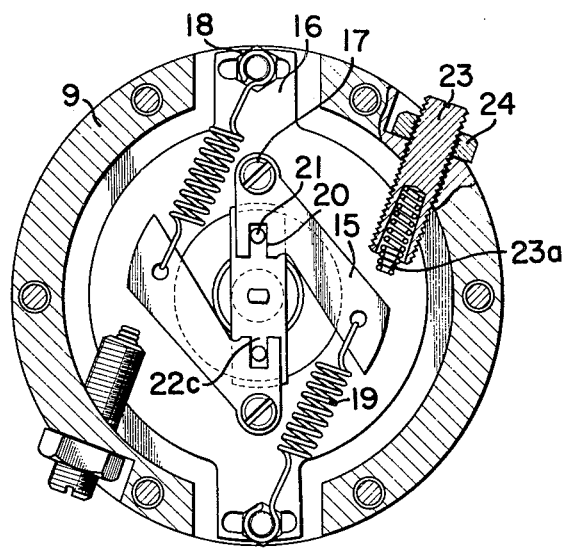
Figure 3:
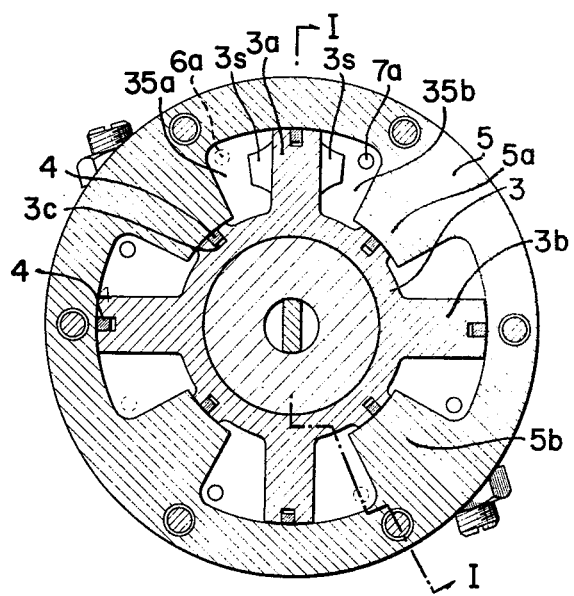
Figure 4:
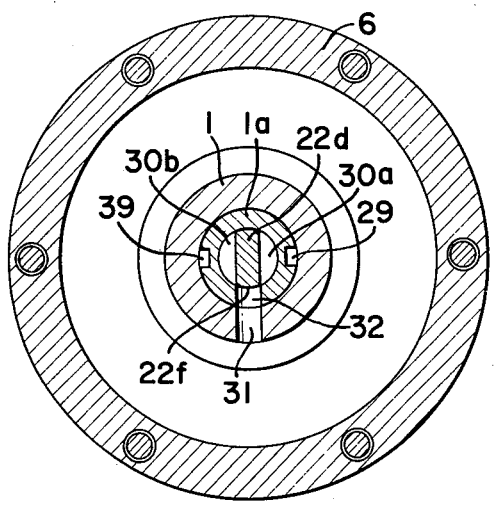
Figure 5:
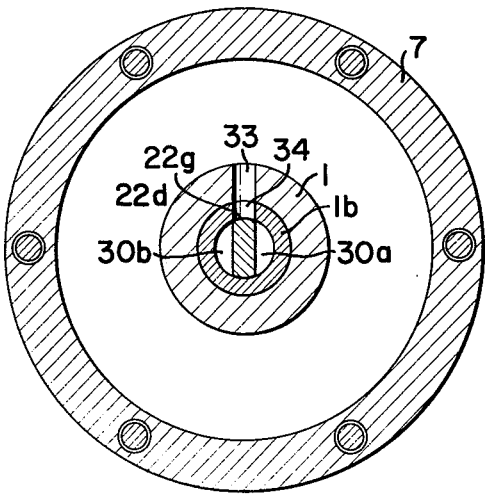

A drive shaft 1 is engaged with a crank-shaft member of an engine (not shown) through a spline 2. On the outer periphery of the drive shaft 1 is engaged with a rotor having vanes 3a and 3b through a spline (not shown). The vanes 3a and 3b are fitted oiltightly and slidably by seals 4, each having a sheet spring 3c, to a casing 5 between radial members 5a and 5b and the rotor 3, to the radial members 5a and 5b between the vanes 3a and 3b. Both left and right openings of the casing 5 are closed by side plates 6 and 7 and respectively connected oiltightly and slidably to the outer periphery of the drive shaft 1, the rotor 3 and the sides of the vanes. On the outer sides of the side plates 6 and 7 are fitted covers 8 and 9 respectively tightly and slidably with the outer periphery of the drive shaft 1. These covers together with the side plates 6 and 7 respectively form oiltight chambers 10 and 11. The casing 5, the side plates 6 and 7, and the covers 8 and 9 are integrally connected to each other and fixed by bolts 12 to a driven shaft or a pump gear member 13 provided in the opposite side to the spline 2. The gear member 13 is in engagement through a gear 13a with a cam shaft of a fuel injection pump, not shown. In a chamber 14 formed between the cover 9 and the gear member 13, a pair of flyweights 15 are located in symmetry relative to the drive shaft 1, each being pivotably mounted at one end on a screw 17 fitted with a plate 16 and connected at the other end to an extension of a screw member 18 for fixing the plate 16 to the cover 9 by means of a spring 19 for preventing the flyweight 15 from being opened by centrifugal force. The plate 16 can move around within certain limits by the screw member 18 as it is loosened and can be adjusted the mounting load applied on the spring 19. Thus the acting point of the flyweight 15 is a point where a longitudinal groove 20 engages with a pin 21. A Pilot valve 22 has flanges 22a and 22b, a plate 22c and a flat shaft 22d between the flanges 22a and 22b. The plate 22c is fixed to an end of an extension shaft 22e on the flange 22b of the pilot valve 22. The pin 21 projects from a surface directed to the chamber 14 of the plate 22c and fixed on the surface. The pilot valve 22 has a cylinder which is oiltightly fitted to an inner bore of the drive shaft 1 and bushes 1a and 1b on both sides of the drive shaft 1. In the inner bore of the drive shaft are provided oil chambers 30a and 30b which are isolated by a flat shaft 22d serving as a boundary wall. Oiltightness of the flat shaft is maintained by lands 22f and 22g which may form a cylindrical surface of the flat shaft 22d. When the flyweights 15 open outwardly against force of the springs 19 due to centrifugal force, therefore, the pilot valve 22 is caused to turn round clockwise through the pin 21 and the plate 22c as shown in FIG. 2. A second spring 23a is oppositely directed to the opening of the flyweight 15 housed in the inner bore of an adjusting bolt 23 threaded into the cover 9. The spring 23a cooperates with the spring 19 with a rotational speed larger than predetermined one and can vary the advance angle charateristics within a high speed area. The initial speed of the rotation can be simply controlled by loosening a nut 24 and adjusting the bolt 23. A torsion and compression spring 25 is fixed at the ends respectively to the drive shaft bush 1b and the plate 22c, between which it is compressed and is adapted to open the flyweight 15 outwards against tension of the spring 19. The torsion and compression spring thus serves to remove a play between the flyweight 15 and the pin 21 to determine the axial position of the pilot valve 22. The drive shaft 1 is fitted with a collar member 26 oiltightly contacting with the cover 8 on the driving side. The collar member 26 is provided with a flow passage 27 which forms an inlet port for a working oil. A similar flow passage 28 of the drive shaft 1 and a longitudinal groove provided on the outer periphery of the bush 1a and forming a flow passage 29 between the bush and the drive shaft 1 are connected to a chamber 30a formed between the flanges 22a and 22b. An oil passage 39 consisting of a longitudinal groove on the outer periphery of the bush 1a having an angle 180° rotated from the flow passage 29 communicates to an oil chamber 30b. The oil passage 39 then connects the oil chamber 30b to an atmospheric chamber 41 via a radial hole 40 opening outwords from the flange 22a. The chamber 10 is connected to the inner bore of the bush 1a inside the flange 22a through radial flow passages 31 and 32 respectively in the drive shaft 1 and the bush 1a. The chamber 11 is connected to the inner bore of the bush inside the flange 22b through similar flow passages 33 and 34 of the drive shaft 1 and the bush 1b. These flow passages are respectively closed by a land 22f or 22g at the neutral position in the pilot valve 22 and controlled so as to communicate to the oil chamber 30a or 30b by rotating the pilot valve 22 around. To this end, thickness of the lands in the peripheral direction is made equal to or slightly larger than the communication ports in the flow passages 32 and 34. Thus, when the pilot valve 22 turns round clockwise in FIG. 2 from the closed position of the communication port of each land, the flow passage 32 is connected to the oil chamber 30b, while the flow passage 34 to the oil chamber 30a. Inversely, when the pilot valve 22 is turned round anticlockwise, the flow passage 32 is connected to the oil chamber 30a and the flow passage 34 to the oil chamber 30b. Inner walls of the casing 5 consist of the radial members 5a and 5b which form same number chambers as the vanes and with the inner surfaces of which are oiltightly contact the seals S fitted into the boss in the rotor 3. The vanes 3a and 3b divide these chambers into two operating chambers 35a and 35b, the operating chamber 35a being communicated to the chamber 10 provided between the side plate 6 and the cover 8 via the passage 6a in the side plate 6 and the operating chamber 35b, to the chamber 11 formed between the side plate 7 and the cover 9 via the passage 7a in the side plate 7. The stopper 3S which projects from both sides of the vane defines an area of relative movement between the rotor 3 and the casing 5 upon engagement with the radial members of the casing 5, while at the same time preventing the closing of the passages 6a and 7a by the vane 3a. The direction of rotation of the drive shaft when the device is used is restricted in the anti-clockwise direction in FIG. 2. Another embodiment of the pilot valve 22 includes a construction such that an opening 42 is provided in the flange 22a, connecting the oil chamber 30b to the atmospheric pressure chamber 41, so as to dispense with the use of the flow passage 39 and the opening 40 in the longitudinal groove of the bush 1a.

Operation of the device of the invention is now explained. Upon the rising rotation, the flyweights 15 are opened outwardly against the force of the springs 19. The pilot valve 22 is then rotated clockwise relative to the drive shaft 1 in FIG. 2, and opens the flow passages 32 and 34 to communicate the operating chamber 35a to the atmospheric pressure side via the passage 6a, the chamber 10, the flow passages 31 and 32 and the oil chamber 30b; and also communicate the operating chamber 35b to the hydraulic pressure supply source via the passage 7a, the chamber 11, the flow passages 33 and 34, and the oil chamber 30a. In the inner chamber 30a is always supplied a high pressure operating oil through a feed pump, not shown, via the operating oil feed port 27 and the flow passages 28 and 29. Therefore, the operating oil flows into the operating chamber 35b, while the operating oil in the operating chamber 35a communicating to the atmospheric pressure side flows out of the device. The casing 5 is moved in the rotational direction of the drive shaft by differential pressure between the two chambers. This causes a phase difference, i.e., an advance angle between the drive shaft 1 and the gear member 13 in the rotational direction of the drive shaft. When the casing 5 rotates in an amount equal to that of rotational rise, the plate 16 integral with the casing 5 and the flyweight 15 supported by the plate also rotate. The pilot valve 22 is then rotated anti-clockwise through the pin 21 in FIG. 2, so that the flow passages 32 and 34 are again closed. Thus, the operating chambers 35a and 35b are closed oiltightly so that the rotation is transmitted with the advance angle retained in the amount of rotational rise. In the area of speed higher than predetermined one, the flyweight 15 may abut the second spring 23a so that the advance angle characteristics may become moderate much more than when the spring 19 produces a single action relative to the variation of rotational speed. Due to combination of these springs therefore, there may be obtained an advance angle characteristics most adapted to the engine. The initial speed of rotation also may be adjusted by having the screw member loosened, rotating the plate 16 and changing the load charged by the spring 19. Inversely in case of rotational drop, the flyweight 15 is closed inwards by the spring 19, so that the pilot valve 22 is rotated in the counter-clockwise direction in FIG. 2. The operating chamber 35a is connected to the inner chamber 30a and the operating chamber 35b, to the oil chamber 30b, respectively. The operating oil flows into the operating chamber 35a and the casing 5 is rotated in an amount equal to the rotational drop in the reverse direction. Transmission of rotation is thus made with the same condition maintained. Even a larger driving torque is transmitted in the same way because of the non-compressibility of the fluid. If the change in torque is large, the advance angle will not be changed. If the springs 19 and 23a are provided at a proper angle respectively to a line connecting the axis of the screw 17 which pivotally mounts the flyweight 15 and the acting point for the flyweight 15, it is possible to obtain a linear relationship between the advance angle and the rotational speed. In absence of such an angle, the spring force and the centrifugal force may be proportioned and the centrifugal force is proportional to the square of the rotational speed, the relation between the advance angle and the rotational speed may cause a secondary curve. In the construction as described above, since the flyweight opens larger outwards, the flyweight 15 and the springs 19 and 23a may assume a relative position such that the angle may become smaller and the spring force may increase. The spring force may be changed as in the secondary curve relative to the centrifugal force. Therefore, the spring force can offset the change of the centrifugal force to the rotational speed thereby to obtain a linear relationship.

According to the construction of the invention as described above, since the pilot valve takes a simple form which consists of the flat shaft and the flanges of a cylindrical shape, which pilot valve can control the supply or exhaust oil passages for the operating chambers 35a and 35b, the construction makes it possible to be easy to manufacture in massive scale and also obtain a sure operation as it makes an easy working of valve controlling parts having cylindrical surfaces of a flat shaft serving as lands.

Many variations may be effected without departing from the spirit of the invention. It is to be understood that these, together with other variations in details, are anticipated by the appended claim.

I claim:

1. A hydraulic, automatically adjustable timing device for fuel injection in which a rotor having vanes and a casing having radial members are coaxially connected to a drive shaft and a driven shaft respectively, each vane and each radial member forming an operating chamber having a passage to permit fluid in and out; the bore of said drive shaft having disposed therein a pilot valve rotatable by centrifugal force of flyweights and having separate fluid chambers provided with fluid passages respectively, said pilot valve controlling the opening and closing of the fluid chambers, resulting in rotational transmission and relative movement between the drive shaft and the driven shaft through fluid present in the chambers; the pilot valve having a flat shaft which separates the two fluid chambers and forms lands to control communication of the flow passage with the fluid chambers, said lands being parallel to the axis of said pilot valve, said chambers being in communication with the atmospheric pressure side and the fluid pressure source side respectively.

2. A device according to claim 1 in which a flange of the pilot valve is provided with an opening.

* * * * *